United States Patent Office 2,866,686
Patented Dec. 30, 1958

2,866,686

PREPARATION OF RED OXIDE OF IRON

Leonard M. Bennetch, Bethlehem, Pa., assignor to C. K. Williams & Co., East St. Louis, Ill., a corporation of Delaware No Drawing. Original application September 16, 1952, Serial No. 309,949, now Patent No. 2,785,991, dated March 19, 1957. Divided and this application September 13, 1956, Serial No. 609,552

11 Claims. (Cl. 23—200)

The present invention relates to the production of red ferric oxide of the type used as pigments incorporated in paint, enamel and lacquer compositions, and in natural and synthetic rubber and other plastic compositions, as well as in cement, stucco and the like.

It is helpful to a clear understanding of the invention, to note that where commercially pure anhydrous red ferric oxide is produced either by calcination in a furnace or by exposing iron compounds in other ways to high temperature and pressure followed by water washing to remove soluble impurities, filtering, drying and finally grinding, the procedure is costly, firstly because it requires elaborate and expensive manufacturing and control equipment such as kilns, autoclaves, pyrometric instruments and the like; secondly because it requires elaborate collecting or recovery equipment to dispose of the obnoxious acid fumes and dust engendered in such procedure; and thirdly because it requires elaborate mills to grind the hard agglomerated, calcined and possibly sintered particles to the desired size. It is moreover difficult to control to any close degree the shade of the ferric oxide resulting from such procedure.

It is among the objects of the invention to provide a process which lends itself efficiently to large output of red ferric oxide and without obnoxious by-product formation by the use of simple equipment operated at low temperature and at atmospheric pressure with a total elimination of kilns, autoclaves or costly control equipment such as pyrometric instruments, and which process yields a uniform product of soft texture, with no marked tendency to agglomerate and therefore easily comminuted to particle sizes considerably less than one micron and of shades easily predetermined and controlled anywhere within the range between the lightest red and the deepest maroon.

Another object is to provide a process for making red ferric oxide that may be used in wet filter cake form as a pulp color for aqueous dispersion, as in imprinting wall paper, in emulsion paints, and in the coloring of cement and stucco or the like, and which may be readily converted by substituting any of a wide variety of suitable organic media for water to produce a flush color of any desired specification.

Another object is to provide an economical method for obtaining a richer shade of red ferric oxide without adding costly organic dyestuffs, lakes or toners to red ferric oxides of the types that are known to the paint, enamel and lacquer industries.

Another object is to provide a method for readily producing red ferric oxides, either in the hydrated form or in the anhydrous form, the latter being produced from the former by a simple procedure without the generation of fumes, to yield a product of deepened color and enhanced tinctorial value.

Another object is to provide a method of the above type that yields red ferric oxide of any desired shade in extremely minute, rounded particles that renders the same especially advantageous as the pigment component of rubber, natural and synthetic and other plastics.

This application is a division of my copending application Serial No. 309,949, filed September 16, 1952, now Patent No. 2,785,991, which in turn is a continuation-in-part of my application Serial No. 749,861, filed May 22, 1947, now abandoned.

In the earlier of these applications, a process is disclosed involving the preparation of a colloidal hydrous ferric oxide seed by combining a ferrous salt in aqueous solution under atmospheric pressure and temperature with a solution of alkali in substantially equivalent proportions, the alkali being somewhat, preferably approximately 5%, in excess of combining proportions, subjecting the aqueous slurry formed to oxidation, next removing excess free alkali by adding an amount of ferrous salt at least equivalent to such excess alkali and again oxidizing, after which the said seed is utilized for the formation of red iron oxide pigments in accordance with the procedures disclosed in detail in the instant application. The second of the above-mentioned earlier applications, and as well the instant application, discloses that the hydrous ferric oxide colloidal seed can be produced by the reaction of the ferrous salt with alkali provided such reactants are combined in certain numerically defined, substantially equivalent proportions, as hereinafter set forth in more detail.

Where an iron salt solution is reacted with substantially less than the combining proportions of alkali, a colloidal ferric hydrate results which is of goethite structure as determined by X-ray analysis. Upon continued maturing and processing, such seed yields yellow ferric oxide monohydrate, of like goethite structure. This yellow ferric oxide monohydrate results even where alkali is employed in proportion sufficient to neutralize anywhere up to as much as 75 to 85 percent of the iron salt solution.

The present invention is based on the surprising discovery that where the colloidal iron oxide seed is formed in novel manner, that is, by reacting an iron salt solution with close to its combining proportions of alkali, the resultant product upon further processing or maturing by growth of particles is not yellow oxide, but an entirely new precipitated red oxide of iron of great commercial value, which iron has the hematite or hydro-hematite structure as revealed by X-ray analysis.

In particular I have discovered that such precipitated red oxide of iron in the hematite or hydro-hematite form results from a starting seed in which the proportion of alkali is between 0.9 and 1.1 equivalent parts per equivalent part of iron salt. In this narrow range of proportions alone is the seed produced leading to the production of the red oxide in the subsequently employed pigment producing step. If a greater or lesser proportion of alkali is employed, the yellow oxide of goethite structure inevitably results.

In a preferred procedure, the colloidal seed suspension is prepared by combining ferrous salt, preferably copperas, ($FeSO_4 \cdot 7H_2O$), in aqueous solution under atmospheric pressure and temperature, with a solution of alkali, preferably sodium hydroxide, to form an aqueous slurry. Adding the iron salt solution to the alkali is somewhat preferable to adding alkali to iron salt solution, as it yields a slurry of lower viscosity which is more easily mixed.

While copperas is ordinarily preferred as the iron salt because of its low cost as is sodium hydroxide as the alkali, it is understood that other iron salts and other alkaline agents may be employed within the scope of the invention. Among numerous other ferrous salts, the ferrous chloride or acetate or mixtures thereof may be employed. Among other alkalies, ammonium hydroxide, sodium carbonate and calcium hydroxide may be used.

In one illustrative practical manufacturing procedure, 1900 pounds of caustic soda are dissolved in water to make 4500 gallons of solution and 6600 pounds of copperas are dissolved in water to make 4500 gallons of solution. This is practically one equivalent of alkali per equivalent of iron salt. The latter solution is pumped into the former and dispersed by stirring. The ferrous hydroxide slurry thus made is subjected to oxidation, preferably by blowing air therethrough at room temperature, thereby forming the desired colloidal iron oxide seed or starting material.

In accordance with the procedure claimed in the parent application Serial No. 309,949, this seed is further processed by heating to 50° to 100° C., but preferably 70° to 80° C., under conditions to develop upon the seed a precipitate of red oxide of iron. The desired precipitate of red oxide of iron upon the seed may be accomplished under the temperature conditions mentioned, by adding copperas crystals or solution to establish an iron salt concentration of 0.1 to 0.5 pound per gallon which serves as a catalyst and then introducing metallic iron such as mild steel scrap, and resuming oxidation preferably by blowing air through the processing tank until the initial seed material has matured and grown to the desired shade of precipitated red iron oxide.

In the alternative procedure claimed in this divisional application, the initial starting slurry is caused to mature and develop into red oxide or iron under the temperature conditions mentioned, by using alkali instead of metallic iron in the final hot phase of the process. In this modification, alkali as for example soda ash, is added to the hot starter slurry under oxidizing conditions at such a rate that the pH value of the slurry does not exceed 4.0. Thus the iron oxide necessary for the growth of the initial starting seed is furnished by the reaction of alkali and iron salt solution rather than the direct oxidation of metallic iron, as in the first procedure. The addition of alkali is continued, and additional iron salt added from time to time to insure its presence in the slurry, until the desired shade of red oxide of iron has developed, at which time the process is ended.

When the desired red iron oxide is obtained by either of the alternative procedures set forth, the pigment is separated from the slurry by known procedures of centrifugation or filtration, and is then washed and dried and the dried cake readily disintegrated.

This process will yield a light shade of red oxide in about 24 hours of operation and may be carried on to yield the deepest shade of maroon in less than one week of operation.

This is sharply to be contrasted with the use of proportions of alkali outside of the critical range of 0.9 to 1.1 equivalents of the iron salt in which in about a week of operation a light shade of yellow oxide of iron is produced and several weeks of such continuous operation would be required to produce the deepest commercial shades of yellow.

By virtue of the aqueous medium in which precipitated red iron oxides are prepared according to the present invention, the product contains a small amount of combined water and thus is hydrated. This combined water is greatest in the light red oxide and least in the deep shades but in every case is less than one molecule of combined water per molecule of ferric oxide. This is a distinction over yellow oxide of iron which has a greater proportion, that is, one full molecule of combined water per molecule of ferric oxide. Commercial yellow oxide of iron contains 10 to 12% of combined water whereas the precipitated red oxides of the present invention contain but 2 to 8% of water.

If the water combined in the red oxide of the present invention, is driven off by heat treatment for 10 minutes at about 1150° F., the red color is slightly deepened with some increase in tinctorial value. The mass tones of the precipitated reds, both before and after heat treatment, according to the present invention, are richer in color value than are corresponding shades of calcined copperas, red oxides or calcined yellow oxides of iron.

In operating between the critical limits set forth in combining proportions of alkali to iron salt of 0.9 to 1.1, the starting seed is generally a hydrous ferric oxide, red in color, but it has been found that where the proportion of alkali used between the critical limits set forth, is between 0.95 and 1.0 part, the seed may be dark brown to black in color, indicating the presence of some hydrous ferrous oxide in combination with the hydrous ferric oxide. On further processing of such seed, the desired precipitated red oxide nevertheless results, so that the critical range of alkali, as above set forth, is anywhere between 0.9 to 1.1 molecular equivalents of the iron salt used in making the seed.

It will be understood that the ingredients used in the preparation of the red oxide, according to the present invention, are commercial products which are far from chemically pure. Analysis of commercial forms of yellow iron oxide produced from impure chemicals, as well as of the red iron oxide produced according to the present invention from like impure chemicals, shows a substantial divergence in the percentage of anhydrous ferric oxide present in the final product from that which would be expected were the product chemically pure. Thus while chemically pure yellow iron oxide, $Fe_2O_3 \cdot H_2O$ would have 89.8% of anhydrous ferric oxide, there is present only 87.6% of such anhydrous ferric oxide in the commercial product, the difference being accounted for by various impurities including mainly sulfur trioxide and also aluminum and titanium oxides, silica and uncombined moisture.

In the product produced according to the present invention from commercial grades of copperas and commercial grades of sodium hydroxide, the percentage of anhydrous ferric oxide would be from 88.4 to 96.0, depending on the shade in the range between the lightest red and the darkest maroon, where the like chemically pure product would range in percentage of anhydrous ferric iron oxide between 91.0 and 98.0.

Red iron oxide produced according to the present invention would have, in a typical light shade of red, an approximate formula of $Fe_2O_3 \cdot 0.88H_2O$. A typical dark maroon would show a much lower water content, the approximate formula being $Fe_2O_3 \cdot 0.22H_2O$, while in a medium shade of red the formula would be $Fe_2O_3 \cdot 0.5H_2O$. The proportions of water in the molecule, between the substantial limits set forth, would vary progressively with decrease in water as the oxide is matured from light shade to dark shade of red.

The particle size of the lightest shade of red, with the large proportion of water in the molecule, is well under 0.2 micron, that of the medium shade of red approaches 0.2 micron, and that of the darker shade is somewhat larger than 0.2 micron. In each shade the particle size is considerably smaller than that of corresponding shades produced by calcination and grinding.

By reason of the chemically precipitated character of the product, the pigment is more uniform and softer in texture than are calcined pigments and is accordingly superior for paint, enamel and lacquer compositions and is especially desirable for coating compositions that are to dry to a high gloss.

The particles are more discrete and show less tendency to form agglomerates than where they are prepared by calcination and of course there is no tendency to sinter and the soft product admits of ready disintegration without resort to the elaborate roller mill or wet grinding used in the handling of the calcined product.

The minute particles obtained by the process are of uniform color and soft texture, and for the most part they are crystals of "rounded" character, rounded in the sense that they have diameters of substantially the same length in all axes and have a circular appearance under electronmicrographic examination. The product is especially suitable for incorporation in natural or synthetic rubber or other synthetic plastics or plastic compositions.

The process thus provides a simple technique for producing pigment in any predetermined shade of red from the lightest to deep rich maroons by simply varying the processing time and discontinuing when the appropriate shade has been obtained.

The treatment set forth thus requires no kilns, autoclaves or expensive control equipment and gives rise to no obnoxious fumes or other objectionable by-products.

The pigment prepared by the precipitation process disclosed herein can be used as a pulp color in a liquid medium, and may conveniently be converted to a flush color by replacing the aqueous mother liquor by a suitable organic medium.

The pigment may also be used in the washed and wet filter cake form wherever it is to be employed in aqueous dispersions, such as for instance in imprinting wall paper and for incorporation in cement, stucco and the like. In all of these applications, the pigment has a higher degree of dispersion in the precipitated form than in the calcined form.

The mass, tone or color of the hydrous reds produced is richer and warmer than the corresponding shades of anhydrous calcined product, but due to the combined water content and fine particle size, the tinctorial power is less than that of the calcined product. The shade of the hydrated product prepared according to the present invention may be somewhat deepened with increase in tinctorial value, the degree of such change being greater with the lighter than with the darker product. This is readily accomplished by subjecting the hydrous red ferric oxide to heat treatment to remove that portion of the combined water required to give the desired increase in tinctorial value. Such passing off of water vapor occurs without obnoxious fumes.

As many changes could be made in the above process and many apparently widely different embodiments of this invention could be made without departing from the scope of the claims, it is intended that all matter contained in the above description shall be interpreted as illustrative and not in a limiting sense.

I claim:

1. A process of manufacturing precipitated red ferric oxide which comprises forming colloidal seed particles of hydrous iron oxide by mixing together and reacting a ferrous salt and an alkali in aqueous solution, the alkali being used in the proportion of 0.9 to 1.1 equivalents per equivalent of ferrous salt, and oxidizing the ferrous precipitate formed in the slurry to the ferric state, and thereupon effecting the growth of red ferric oxide upon said seed by heating to 50°–100° C. and introducing oxygen into the resulting slurry containing said seed, adding an iron salt and alkali to the slurry wherein they dissolve and discontinuing the operations when the slurry has reached the color corresponding to the shade of red pigment desired.

2. A process of producing precipitated red ferric oxide particles of predetermined shade of red by first producing a seed by passing air into an aqueous slurry containing ferrous salt and alkali in solution, the alkali being present in proportions of 0.9 to 1.1 equivalents per equivalent of ferrous salt and thereupon precipitating red ferric oxide to effect growth of the seed particles by applying heat within the range of 50° to 100° C. under oxidizing conditions in the presence of an added iron salt dissolved in the slurry and alkali, until the desired shade of red has been attained, thereby producing red hydrated ferric oxide having less than one molecule of water.

3. The combination recited in claim 2, in which the iron salt is present in the mass during growth of the pigment particles in a concentration of 0.1 to 0.5 pound per gallon.

4. A process of preparing precipitated red ferric oxide which comprises treating ferrous sulfate in aqueous solution with 0.9 to 1.1 equivalents of sodium hydroxide solution, oxidizing at atmospheric temperature and pressure with a current of air blown therethrough to form a colloidal iron oxide starting slurry, blowing air through the slurry during heating of the same while maintaining a temperature within the range of 50° to 100° C., introducing ferrous salt and sodium hydroxide during said operations to the slurry wherein they dissolve, and discontinuing the operations when the slurry has reached the color corresponding to the shade of red pigment desired.

5. A process of preparing precipitated red ferric oxide which comprises treating a ferrous salt in aqueous solution with 0.9 to 1.1 equivalents of an alkali hydroxide solution, oxidizing by means of a current of air blown through the solution, thereby forming a colloidal iron oxide starting slurry, introducing oxygen into the slurry while the same is maintained at a temperature of 50° to 100° C., introducing ferrous sulfate and an alkali metal hydroxide during the oxidizing treatment to the hot slurry wherein they become dissolved and discontinuing the operation when the ferric oxide formed in the slurry has reached the color corresponding to the shade of red pigment desired, and thereupon filtering, washing, drying, and disintegrating the precipitated red oxide of iron.

6. A process of manufacturing precipitated red ferric oxide which comprises forming colloidal seed particles of hydrous iron oxide by mixing together and reacting a ferrous salt and an alkali in aqueous solution, the alkali being used in the proportion of 0.9 to 1.1 equivalents per equivalent of ferrous salt, and oxidizing the ferrous precipitate formed in the slurry to the ferric state, and thereupon effecting the growth of red ferric oxide upon said seed by heating to 50°–100° C. and introducing oxygen into the resulting slurry containing said seed, adding a soluble iron salt and alkali to the slurry maintained at a pH not exceeding a value of 4, and discontinuing the operations when the ferric oxide formed in the slurry has reached the color corresponding to the shade of red pigment desired.

7. A process of manufacturing precipitated red ferric oxide which comprises forming colloidal seed particles of hydrous iron oxide by mixing together and reacting a ferrous salt and an alkali in aqueous solution, the alkali being used in the proportion of 0.9 to 1.1 equivalents per equivalent of ferrous salt, and oxidizing the ferrous precipitate formed in the slurry to the ferric state, and thereupon effecting the growth of red ferric oxide upon said seed by heating to 50°–100° C. and introducing oxygen into the resulting slurry containing said seed, adding a soluble iron salt and alkali to the slurry from time to time during said operations at a rate that the pH value of the slurry does not exceed 4, and discontinuing the operations when the ferric oxide formed in the slurry has reached the color corresponding to the shade of red pigment desired.

8. A process of preparing precipitated red ferric oxide which comprises treating a ferrous salt in aqueous solution with 0.9 to 1.1 equivalents of an alkali hydroxide solution, oxidizing by means of a current of air blown through the solution, thereby forming a colloidal iron oxide starting slurry, heating said slurry to a temperature within the range of 50°–100° C. and blowing air through the mass, adding ferrous sulfate and sodium hydroxide to the hot slurry from time to time during said treatment at a rate that the pH value of the slurry does not exceed 4, discontinuing the oxidizing operations when the ferric oxide formed in the slurry has reached the color corresponding to the shade of red pigment desired.

9. A process of manufacturing precipitated red ferric oxide which comprises forming colloidal seed particles of hydrous iron oxide by mixing together and reacting in aqueous solution a ferrous salt with an alkali in excess of combining proportions not exceeding 1.1 equivalents per equivalent of ferrous salt, and oxidizing the ferrous precipitate formed in the slurry to the ferric state, and thereupon effecting the growth of red ferric oxide upon said seed by heating to 50°–100° C. and introducing oxygen into the resulting slurry containing said seed, adding an iron salt and alkali to the slurry wherein they dissolve and discontinuing the operations when the slurry has reached the color corresponding to the shade of red pigment desired.

10. A process of manufacturing precipitated red ferric oxide which comprises forming colloidal seed particles of hydrous iron oxide by mixing together and reacting in aqueous solution a ferrous salt with an alkali in excess of combining proportions not exceeding 1.1 equivalents per equivalent of ferrous salt, and oxidizing the ferrous precipitate formed in the slurry to the ferric state, and thereupon effecting the growth of red ferric oxide upon said seed by heating to 50°–100° C. and introducing oxygen into the resulting slurry containing said seed, adding a soluble iron salt and alkali to the slurry from time to time during said operations at a rate that the pH value of the slurry does not exceed 4, and discontinuing the operations when the ferric oxide formed in the slurry has reached the color corresponding to the shade of red pigment desired.

11. A process of manufacturing precipitated red ferric oxide which comprises forming colloidal seed particles of hydrous iron oxide by mixing together and reacting in aqueous solution ferrous sulfate with an alkali metal hydroxide in excess of combining proportions not exceeding 1.1 equivalents per equivalent of ferrous salt, heating said slurry to a temperature within the range of 50°–100° C. and blowing air through the mass, adding ferrous sulfate and an alkali metal hydroxide to the hot slurry from time to time during said treatment at a rate that the pH value of the slurry does not exceed 4, discontinuing the oxidizing operations when the ferric oxide formed in the slurry has reached the color corresponding to the shade of red pigment desired.

References Cited in the file of this patent
UNITED STATES PATENTS

| 2,388,659 | Ryan et al. | Nov. 6, 1945 |
| 2,696,426 | Marcot | Dec. 7, 1954 |